United States Patent [19]
Imaide et al.

[11] Patent Number: 4,809,074
[45] Date of Patent: Feb. 28, 1989

[54] SOLID STATE IMAGER HAVING A SIGNAL PROCESSING CIRCUIT FOR REDUCING NOISE

[75] Inventors: Takuya Imaide, Yokohama; Hisao Ohdawa, Katsuta; Masaru Noda, Kanagawa, all of Japan

[73] Assignee: Hitachi, Ltd., Tokyo, Japan

[21] Appl. No.: 62,681

[22] Filed: Jun. 16, 1987

[30] Foreign Application Priority Data

Jun. 16, 1986 [JP] Japan ................. 61-138205
Feb. 26, 1987 [JP] Japan ................. 62-41526

[51] Int. Cl.$^4$ .......................................... H04N 5/335
[52] U.S. Cl. ........................... 358/213.15; 358/213.18; 358/113.31
[58] Field of Search ............... 358/213.18, 213.15, 358/213.31, 213.11

[56] References Cited

U.S. PATENT DOCUMENTS 4,333,111 6/1982 Noda et al. ................. 358/213
4,335,406 6/1982 Ohba et al. ................. 358/213
4,355,335 10/1982 Imaide et al. ............... 358/213

OTHER PUBLICATIONS

"Institute of Television Engineers of Japan Technical Report" (TEBS 109-3), vol. 9, No. 45, ED 938 (Feb. 1986).
"A Solid State Camera with a Horizontal Readout MOS Imager", *IEEE Transactions on Consumer Electronics*, Noda et al., vol. CE-3d, No. 3, (Aug. 1986).

*Primary Examiner*—James J. Groody
*Assistant Examiner*—Robert M. Bauer
*Attorney, Agent, or Firm*—Antonelli, Terry & Wands

[57] ABSTRACT

The read out of a signal from an imaging device is conducted during a voltage read out mode, and resetting of a signal output line is carried out each time a signal of a plurality of pixels is read out. Signal charge is accumulated on the signal output line, and is then read out. The accumulated signal is differenced or differentiated at a later stage to reproduce an original signal.

20 Claims, 9 Drawing Sheets

SOLID STATE IMAGER HAVING A SIGNAL PROCESSING CIRCUIT FOR REDUCING NOISE

BACKGROUND OF THE INVENTION

The present invention relates to a solid state imager, and in particular, to a solid state imager suitable for enhancing its sensitivity.

In the prior art, a two-transistor type MOS imaging device having horizontal and vertical MOS switches associated with each photodiode constituting the solid state imaging device has been known. The imager employing such a two-transistior type MOS imaging device is known as a horizontal read out MOS imager. This horizontal read out MOS imager is described in "Institute of Television Engineers of Japan Technical Report" (TEBS 109-3), Vol. 9, No. 45, ED 938 (February, 1986). A summary of the horizontal read out MOS imager described in the abovementioned document is as follows:

Each of the photodiodes forming approximately 500×600 pixels is associated with two switches known as horizontal and vertical transistors, and when light impinges on the photodiode, photoelectric charge is accumulated thereon. This photoelectric charge is read out to a horizontal signal line sequentially line by line in response to horizontal and vertical read out pulses. Then, the vertical switch is closed during each horizontal scanning period, and the read out signal is outputted. The outputted signal is supplied to a processing circuit in a subsequent stage through a pre-amplifier.

In the prior art imager, the drawbacks involved are such that when the illuminance of a subject is equal to 100 luxor less, the picture quality becomes gradually deteriorated as a result of reduced illuminance, and disturbances such as random noise and the like becomes increased. It is described in the aforementioned document that the main source of such random noise is a pre-amplifier of the voltage negative feedback type.

According to another known prior art imager in which the read out of a signal from an imaging device is carried out in a voltage read out mode, a pre-amplifier which has no voltage negative feedback is used. Accordingly, the random noise generated in the pre-amplifier is reduced. However, in this imager, the signal output line is reset every time a signal of one pixel is read out. As a result, noise (reset noise) occurs due to the resetting of the signal output line, and this noise is far greater than the random noise generated in the pre-amplifier. Thus, such a prior art imager has not been suitable for practical use.

SUMMARY OF THE INVENTION

An object of the present invention is to provide a solid state imager having reduced random noise generated in the pre-amplifier and having higher sensitivity.

In accordance with the present invention, the read out of a signal from an imaging device is carried out during a voltage read out mode, and further, the signal output line is reset every time a signal of a plurality of pixels is read out. As a result, the video signal outputted from an amplifier (pre-amplifier) is a combined signal formed by adding a video signal voltage appearing at the present time to a video signal voltage of the immediately preceding time, and then, the output signal of the amplifier (pre-amplifier) is supplied to a differential circuit. From the differencial circuit, there is outputted a differential signal between the video signal of the present pixel and the video signal of the previous pixel (one pixel-period earlier than the present pixel). Owing to this arrangement, a video signal for every one pixel is outputted from the differential circuit.

According to the description foregoing, in the present invention, the pre-amplifier of the voltage negative feedback type is not used, and since the number of times of resetting the signal output line is relatively small, a solid state imager with reduced random noise and having high sensitivity is provided.

DESCRIPTION OF THE PREFERRED EMBODIMENTS

Figure 1:
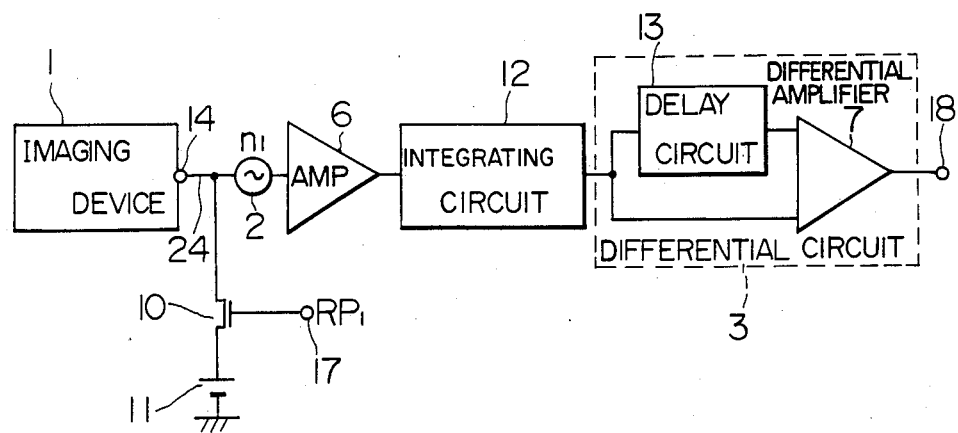
FIG. 1 is a block diagram of an embodiment of the present invention.

The embodiments of the present invention will be described hereinafter. FIG. 1 is a block diagram of an embodiment of the present invention. In FIG. 1, a signal voltage is outputted on a signal output line 24 from an imaging device 1, and it is supplied to an amplifier 6 having high input impedance and low noise. Reference numeral 2 designates a noise source, and the noise generated in the amplifier 6 is shown as an equivalent noise source 2. Resetting means constituted by an FET 10 and a power supply 11 is also connected to the signal output line 24. A signal of a pixel outputted from the amplifier 6 is supplied to an integrating circuit 12. The signal of the pixel supplied to the integrating circuit 12 is integrated therein and is outputted to a differential circuit 3. The differential circuit 3 which is responsive to the difference between adjacent pixels is comprised of a delay circuit 13 and a differential amplifier 7. In the delay circuit 13, the signal inputted thereto is delayed for one pixel period, and then it is supplied to the differential amplifier 7. Thus, a signal in accordance with the difference between the output signal of the delay circuit 13 and the output signal of the integrating circuit 12 is outputted from the differential amplifier 7. In other words, by outputting the difference between the signal delayed for one pixel period (hereinafter referred to as a delayed signal) and the signal not delayed (hereinafter referred to as an original signal), a normal signal waveform is reproduced.

Figure 2:
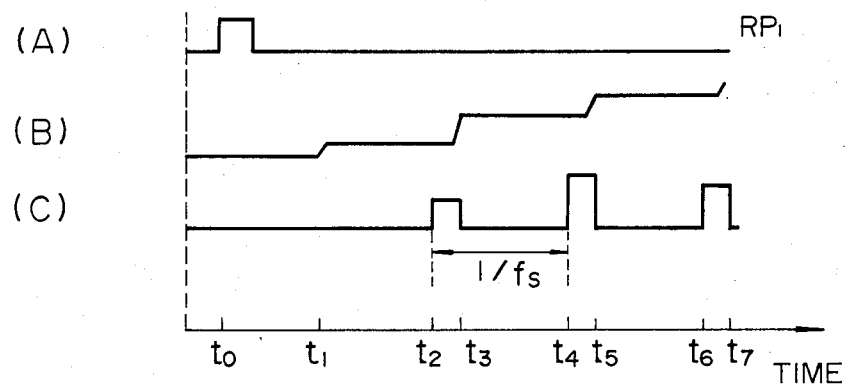
FIG. 2 is a signal waveform diagram showing signal waveforms at various points in the embodiment in FIG. 1.

Waveforms at various points the embodiment in FIG. 1 are shown in FIG. 2. Specifically, FIG. 2(A) shows a reset pulse $RP_1$ applied to a gate of the FET 10. The reset pulse $RP_1$ is, according to this embodiment, inputted every one horizontal scanning period. In FIG. 2(B), there is shown a waveform corresponding to the output of the amplifier 6. A waveform of the output appearing at an output terminal 18 is shown in FIG. 2(C). Capacitance C is present on the signal output line 24 of the imaging device 1, and the value of the capacitance C is about 10 pF. When the reset pulse $RP_1$ is applied to the gate of the FET 10 at a time point $T=t_0$ (FIG. 2), a source-drain circuit of the FET 10 is rendered conductive, and electric charge accumulated on this capacitance C of the signal output line 24 is reset to effect in a potential valve of the power supply 11. Next, during a time interval $t_1-t_3$, a signal of the first pixel of the imaging device 1 is read out. The signal of the pixel of the imaging device 1 is read out at a frequency $f_s$. The signal outputted from the imaging device 1 is amplified by the amplifier 6 and is inputted to the integrating circuit 12 (FIG. 2(B)). In the integrating circuit 12, the signal for the time interval $t_1-t_3$ is compressed into corresponding signal for a time interval $t_2-t_3$, and the compressed signal is outputted. The signal outputted from the integrating circuit 12 is supplied to the differential circuit 3, which produces a difference signal between the signal of the present pixel-period (the non-delayed output of the integrator 12) and the signal of the immediately preceding pixel-period, one pixel-period earlier (the delayed output of the integrator 12). Next, during a time interval $t_3-t_5$, a signal of the second pixel of the imaging device 1 is read out. This signal is amplified by the amplifier 6, and is compressed by the integrating circuit 12 to a signal for a time interval $t_4-t_5$. The signal outputted from the integrating circuit 12 is supplied to the differential circuit 3. In the differential circuit 3, the signal (delayed signal) delayed for one pixel period ($1/f_s$) by the delay circuit 13, that is, the signal during the time interval $t_2-t_3$, and the output signal of the integrating circuit 12, that is, the signal during the time interval $t_4-t_5$ are inputted to the differential amplifier 7, and as a result, a signal for a time interval $t_4-t_5$ shown in FIG. 2(C), is outputted to the output terminal 18. In a similar manner, the signal of each pixel is sequentially read out, and the signal shown in FIG. 2(C), is outputted to the output terminal 18.

Figure 3:
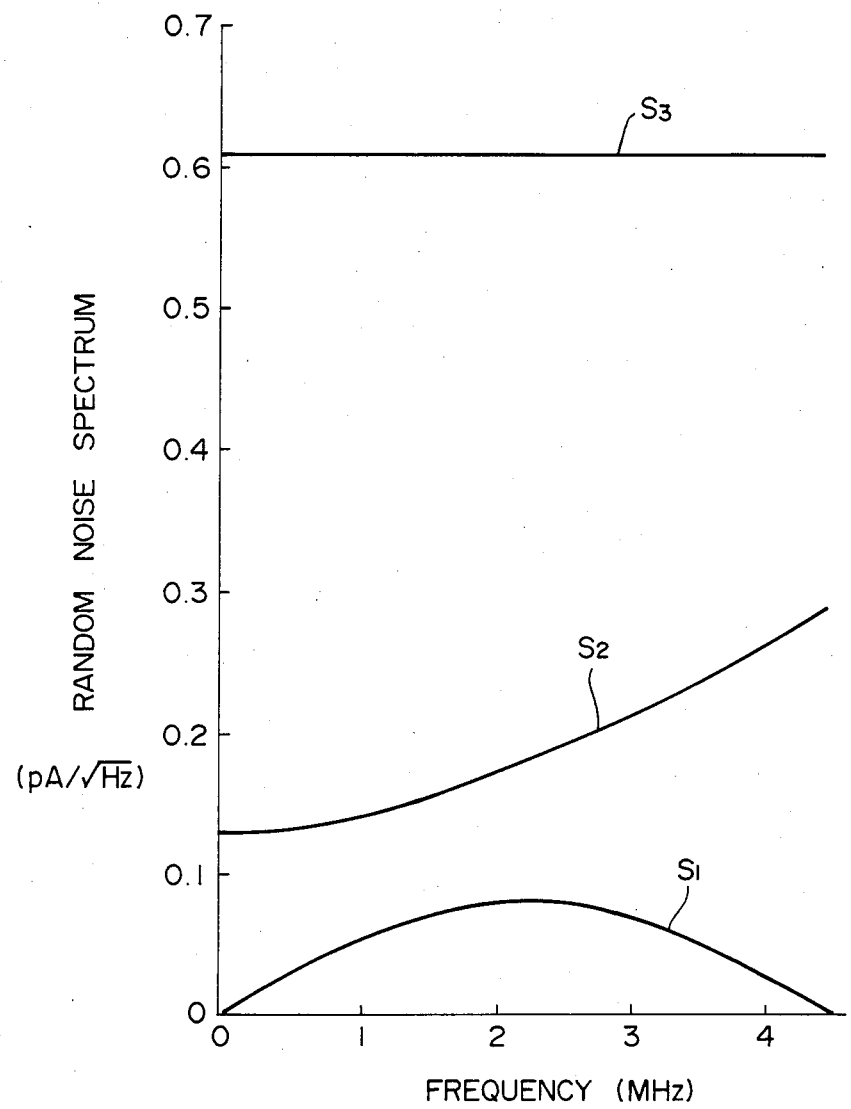
FIG. 3 show graphs of a random noise spectrum showing advantageous effects realized by the embodiment in FIG. 1.

FIG. 3 shows a graph of a random noise spectrum related to the present invention, which is converted to an output current value of the imaging device 1. A graph corresponding to the random noise spectrum related to the prior art is also shown. In other words, the graph in FIG. 3 shows the random noise spectrum in which the spectrum is converted to the output current value supposing that all the noises including the noise $n_1$ of the noise source 2 shown in FIG. 1 are outputted from the imaging device 1. The curve $S_1$ in FIG. 3 is a graph of the random noise spectrum in the embodiment in FIG. 1. The curve $S_2$ is a graph of the random noise spectrum in the prior art horizontal readout MOS imager. The curve $S_3$ is a graph of the random noise spectrum in the prior art imager of the "voltage readout type" (every time the signal of each pixel is read out, the electric signal charge on the capacitance C of the signal output line is read out). As will be seen from FIG. 3, in the present invention, the random noise is reduced significantly.

In the embodiment in FIG. 1, the reset noise due to the transistor 10 is held on the capacitance C during one horizontal scanning period, and since the difference between the original signal and the delayed signal is outputted from the differential amplifier 7, the random noise is advantageously suppressed. Furthermore, as shown in FIG. 3, in the embodiment, the random noise at low frequencies is very small, and a significant noise reducing effect can be obtained with respect to noise of a color signal of a narrow band.

Figure 4:
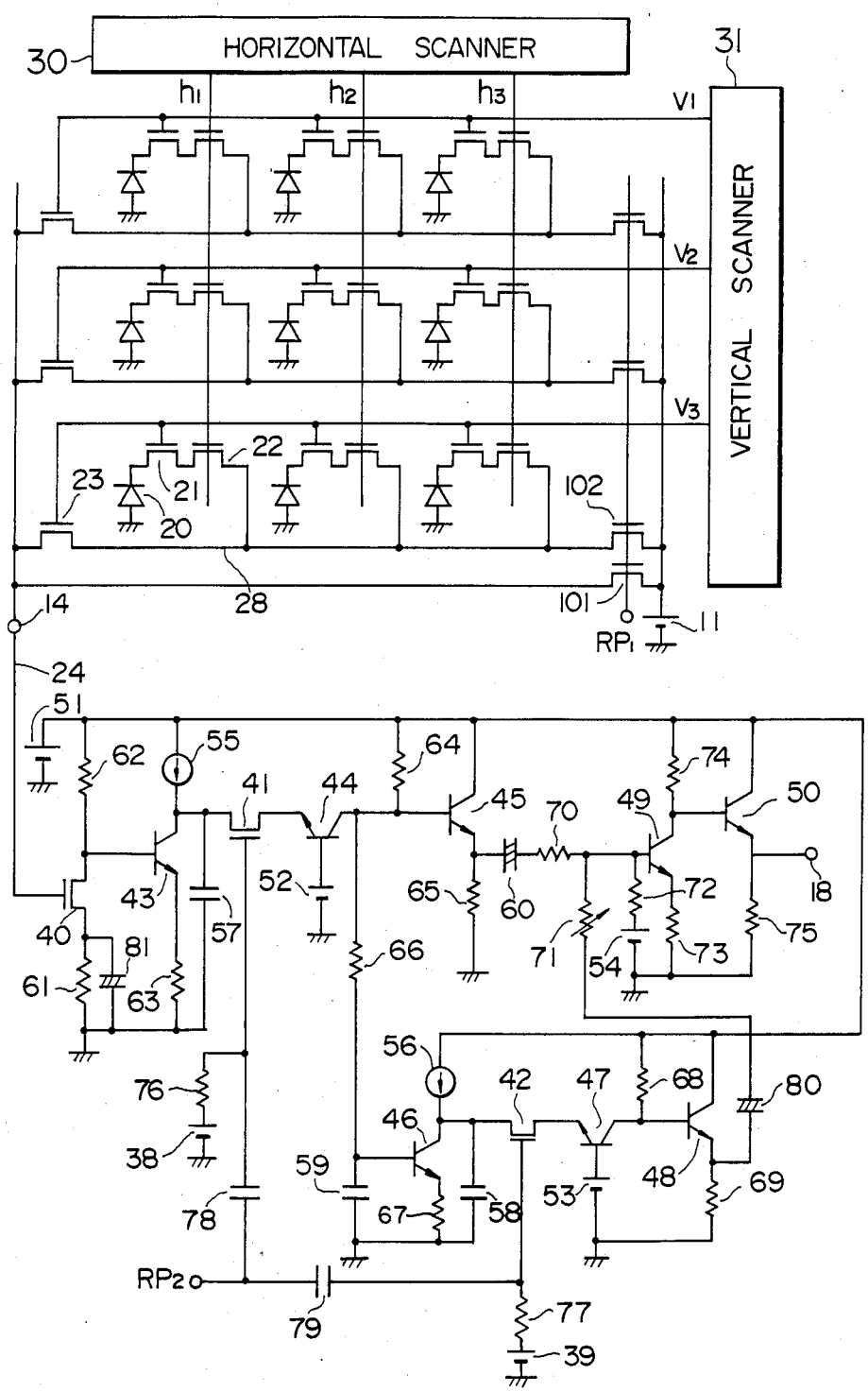
FIG. 4 is a circuit diagram of a specific example of the embodiment in FIG. 1.

In FIG. 4, there is shown a specific circuit diagram of the embodiment in FIG. 1. In FIG. 4, a transistor (FET) 101 corresponds the trnsistor 10 in FIG. 1. In the embodiment in FIG. 4, the FET 101 for resetting is incorporated within the imaging device 1. The imaging device 1 comprises a horizontal scanner 30, a vertical scanner 31, photodiodes 20, switching FETs 21, 22 and 23, FETs 102 for resetting each pixel, and the FET 101 for resetting the output section of the imaging device 1. Specifically, one pixel consists of the photodiode 20, and the FETs 21, 22. Although the actual imaging device 1 includes a great number of pixels, only a portion of the pixels are shown in FIG. 4. The amplifier 6 is comprised of an FET 40, resistors 61, 62, and a capacitor 81. The integrating circuit 12 is comprised of transistors 43, 44, 45, an FET 41, a current source 55, voltage sources 38, 52, resistors 63, 64, 65, 76, and capacitors 57, 78. The delay circuit 13 is comprised of transistors 46, 47, 48, an FET 42, a current source 56, voltage sources 39, 53, resistors 66, 67, 68, 69, 77, and capacitors 58, 59, 79. The delay circuit 13 has a similar circuit arrangement to that of the integrating circuit 12. The differential amplifier 7 includes an adder circuit having resistor 70, 71, an amplifier having transistors 49, 50, a voltage source 54, and resistors 72, 73, 74, 75. In the circuitry shown in FIG. 4, since the polarity of the output of the integrating circuit is opposite to that of the output signal of the delay circuit, both output signals are merely added to each other, and are amplified.

Figure 5:
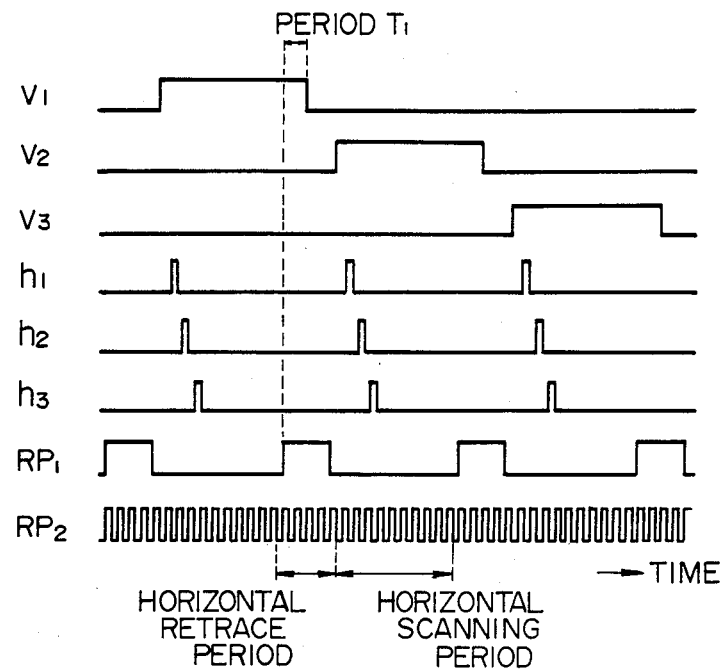
FIG. 5 is a waveform diagram showing waveforms at various locations in the circuit diagram in FIG. 4.

FIG. 5 shows a timing chart for explaining the operation of the embodiment in FIG. 4. The waveform indicated by an identical symbol with that shown in FIG. 4 is generated at the position bearing the symbol.

The circuitry shown in FIG. 4 will be described with reference to the timing chart in FIG. 5.

First, a horizontal signal line 28 and a signal output line 24 are reset to a voltage level of the voltage source 11 at time of occurrence of a reset pulse $RP_1$ during a horizontal retrace period. Next, information of each pixel is sequentially read out by vertical scanning pulses $V_1$, $V_2$ and $V_3$, and horizontal scanning pulses $h_1$, $h_2$ and $h_3$. The signal of each pixel thus read out is amplified by the FET 40.

Then, a current proportional to the signal voltage of each pixel starts flowing from the capacitor 57 to the transistor 43. Hence, the electric charge accumulated on the capacitor 57 decreases by an amount corresponding to the integral of the current flowing into the transistor 43 with respect to time.

Next, the FET 41 becomes conductive in response to the reset pulse applied to a terminal $RP_2$, and the electric charge lost during one pixel period is supplemented from the voltage source 51 to the capacitor 57 through the resistor 64. Accordingly, the result of the integration of the signal for one pixel period appears across the resistor 64 in voltage form. Owing to the aforementioned operation, the decrease in high frequency response can be improved.

The delay circuit 13 is of the entirely similar circuit arrangement with the integrating circuit 12. That is, the voltage appearing across the resistor 64 is supplied to the transistor 46. Thus, the electric charge of an amount proportional to the voltage inputted to the transistor 64 flows from the capacitor 58 into the transistor 46. Next, the FET 42 becomes conductive due to the reset pulse applied to the terminal $RP_2$, and the electric charge lost during one pixel period is supplemented from the voltage source 51 to the capacitor 58 through the resistor 68. In this manner, a voltage appears across the resistor 68 delayed for one pixel period. Since the polarity of the output signal (originalsignal) of the integrating circuit 12 is opposite to that of the output signal (delayed signal) of the delay circuit, both output signals are merely added to each other by the resistors 70 and 71. Then, the signal is amplified by the transistors 49 and 50, and is outputted from the output terminal 18.

Figure 6:
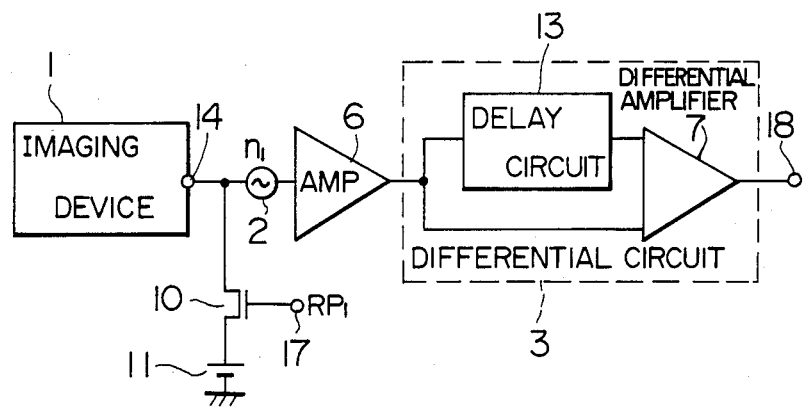
FIG. 6 is a block diagram of another embodiment of the present invention.

In the embodiments shown in FIGS. 1 and 4, the integrating circuit 12 is provided. However, the integrating circuit 12 may be omitted. FIG. 6 shows another embodiment wherein the integrating circuit 12 is not provided. In the case of this embodiment, since high frequency components of the signal decrease due to the holding for one pixel period, the S/N at high frequencies is deteriorated by an amount corresponding to the decrease of the high frequency components. The operation of each circuit in the embodiment in FIG. 6 is similar to that in FIG. 1.

In the embodiments in FIGS. 1 and 4, a phenomenon similar to that of a residual image occurs. Supposing that signal electric charge read out to the capacitance C on the signal output line 24 from an mth pixel in the horizontal direction is represented by $Q_m$, and that accumulated capacitance of each pixel is represented by $C_p$, when an lth pixel is selected, the residual electric charge $Q_{rl}$ on the pixel, is expressed by the following formula (1), because, $$C_p << C, \quad (1)$$

$$Q_{rl} = \sum_{m=1}^{l} Q_m C_p/C$$

In the case of a still picture, since $Q_{rl}$ is not changed, unnecessary electric charge is not read out from the pixel. However, in the case of a moving picture, a change in $Q_{rl}$ between fields is read out from the pixel. As a result, the phenomenon similar to that if a residual image (hereinafter, this phenomenon is referred to as a residual image) occurs.

For example, supposing that $C_p/C = 10^{-3}$, and the number of photoelectric transducer elements in the horizontal direction per one output terminal is 250, at the right end of the picture screen, electric charge corresponding to $(-\frac{1}{4})$ of a change during one field of the average signal electric charge is read out.

Figure 7A:
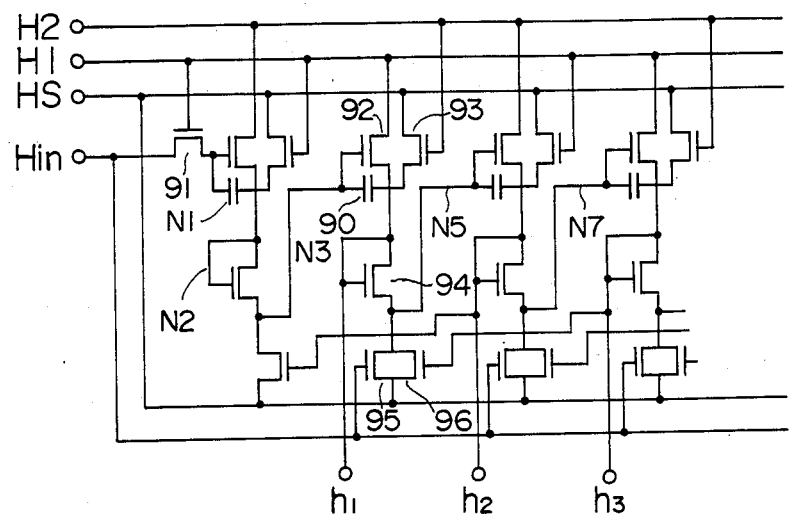
FIG. 7A is a circuit diagram of the horizontal scanning circuit in the embodiment in FIG. 6.
Figure 7B:
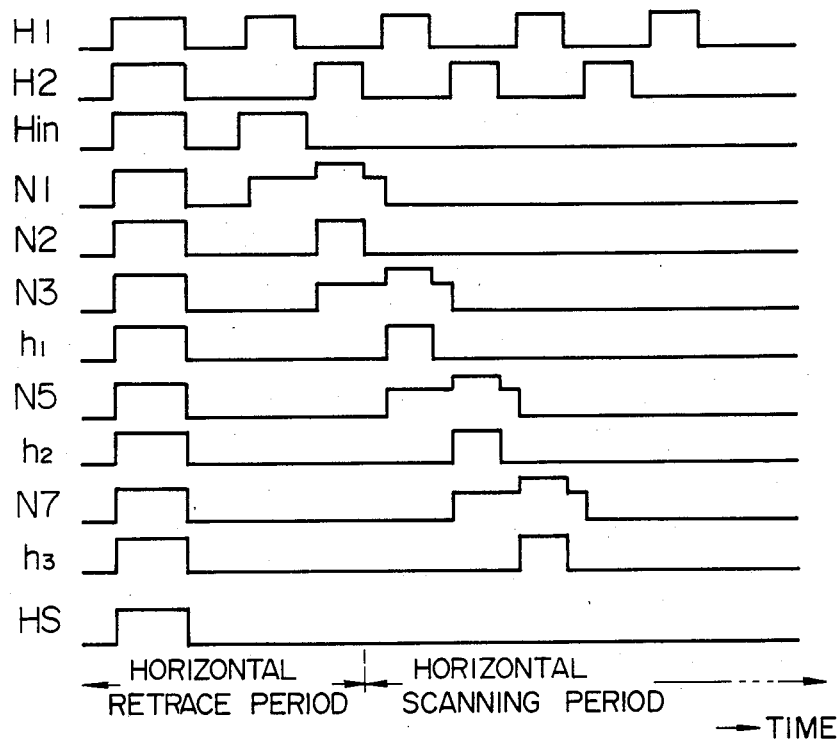
FIG. 7B is a signal waveform diagram showing signal waveforms at various locations in the horizontal scanning circuit in FIG. 7A.

FIGS. 7A and 7B show an embodiment which solves the problem of this residual image. FIG. 7A shows an embodiment of a horizontal scanner in the embodiment shown in FIG. 4. In this embodiment, other portions of an imaging device, the arrangements of an amplifier, an integrating circuit, a differential circuit, etc., are the same as that in the embodiments in FIG. 4. In other words, in the horizontal scanner 30 in FIG. 4, the embodiment shown in FIG. 7A is used. FIG. 7B is a timing chart for the circuit shown in FIG. 7A. The simbols attached to the waveforms in FIG. 7B indicate various parts in FIG. 7A at which the waveforms are generated. In FIG. 7A, reference numeral 90 designates bootstrap capacitance, and reference numeral 91 to 96 designate transistors.

In the example of the horizontal scanner shown in FIG. 7A, during the period $T_1$ shown in FIG. 5, that is, in the first period of the horizontal retrace period, a row selecting pulse in the previous scanning period is still at a high level, and also, during the period in which the $RP_1$ is at a high level, high level signals are inputted to all input terminals $H_1$, $H_2$, $H_s$ and $H_{in}$. As a result, all output signals $h_1$, $h_2$ and $h_3$ of the horizontal scanner 30 becomes a high level, and all pixels of the row selected during the previous horizontal scanning period are reset. Moreover, by adjusting the value of the resistor 71 in FIG. 4 suitably, the residual image can be reduced.

The reason for the decrease of the residual image will be described hereinafter. The horizontal scanner as shown in FIG. 7A is used, and after scanning each row, when all pixels of the row are reset, the signal electric charge $Q_l$ of an lth pixel in the horizontal direction is a sum of electric charge $Q'_l$ read out to the capacitance C on the signal output line 24 and electric charge $Q_{rl}$ which remains on the pixel, and it is expressed by the following formula.

$$Q_l = Q'_l + \sum_{m=1}^{l} Q'_m C_p/C \quad (2)$$

Accordingly, when the difference of the original signal and the delayed signal is obtained in the differential amplifier 7, and if the original signal is $(1 + C_p/C)$ times the delayed signal, then, $$(1 + C_p/C) \sum_{m=1}^{l} Q'_m - \sum_{m=1}^{l-1} Q'_m = \quad (3)$$

$$Q'_l + \sum_{m=1}^{l} Q'_m C_p/C = Q_l$$

Thus, the influence of the electric charge remaining on the pixel is eliminated, and the residual image disappears. Similar effect can be obtained by adjusting the value of the resistor 71 so that the delayed signal is $(1 - C_p/C)$ times the original signal.

As described in the foregoing, in this embodiment, a solid state imager with low noise and still, causing no residual image is provided.

Figure 8:
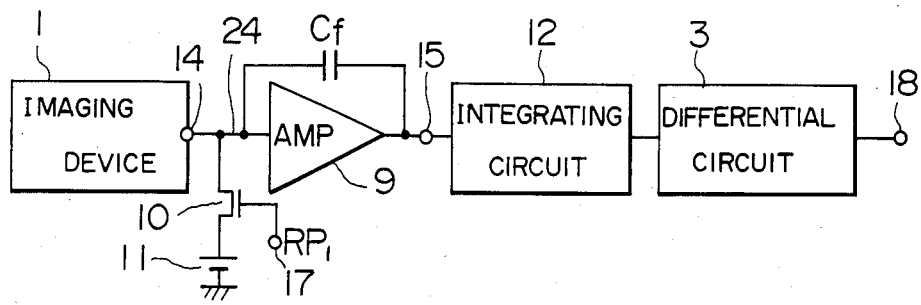
FIG. 8 is a block diagram of still another embodiment of the present invention.
Figure 9:
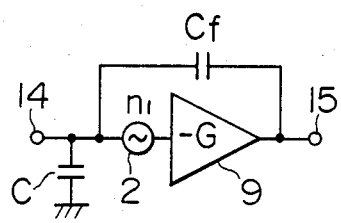
FIG. 9 is a block diagram showing a part of the embodiment in FIG. 8.
Figure 10:
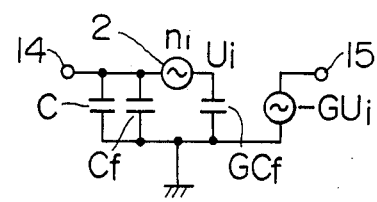
FIG. 10 is a circuit diagram showing an equivalent circuit of the block diagram in FIG. 9.

FIG. 8 shows another embodiment. In the embodiment shown in FIG. 8, since a capacitive negative feedback is applied from the output terminal of a high input impedance, low noise inverting amplifier 9 to the output terminal 14 of an imaging device 1 (a capacitor Cf is connected), the residual image is reduced. In other words, the embodiment in FIG. 8 is formed by replacing the amplifier 6 in the embodiment in FIG. 1 by the differential amplifier 9 and the feedback capacitor Cf. FIG. 9 shows a circuit between the imaging device output terminal 14 and the inverting amplifier output terminal 15 in the embodiment in FIG. 8. FIG. 10 shows an equivalent circuit of the circuit in FIG. 9. In FIGS. 9 and 10, the symbol C designates capacitance C on the signal output line 24, the symbol Cf designates feedback capacitance, and the symbol G designates a gain of the inverting amplifier 9. As shown in FIG. 10, due to the Miller effect, the capacitance of the imaging device output terminal 14 is increased, and a voltage variation at the imaging device output terminal 14 is suppressed to a value $\beta_1$ times the original value, in which $\beta_1$ is expressed by the following formula (4):

$$\beta_1 = \left[1 + \frac{Cf}{C}(1 + G)\right]^{-1} \quad (4)$$

Accordingly, the residual image is also suppressed to $\beta_1$ times ($\beta_1 < 1$) the original value.

Due to the addition of the capacitance Cf, the signal to noise ratio is deteriorated. The deteriorated signal to noise ratio is $\beta_2$ times the original value, in which $\beta_2$ is expressed by the following formula (5):

$$\beta_2 = 1 + \frac{Cf}{C} \quad (5)$$

Thus, by designing $Cf < < C$, the deterioration can be limited to a slight value. Further, the voltage gain of the capacitive feedback amplifier is determined by $\beta_3$ expressed by the following formula (6):

$$\beta_3 = \left[\frac{1}{G} + \frac{Cf}{C}\left(1 + \frac{1}{G}\right)\right]^{-1} \quad (6)$$

For example, if $Cf/C=0.05$, and $G=1,000$, then the noise will be increased to 1.05 times (i.e., $\beta_2=1.05$), whereas the residual image will be reduced to 0.02 times (i.e., $\beta_1=0.02$). At this time, the voltage gain is 20 times (i.e., $\beta_3=20$), and the NF (noise figure) at a later stage of the imaging device output terminal 14 will not pose any problem.

Further, in this embodiment, there is no need to use the horizontal scanner as shown in FIG. 7.

As described in the foregoing, in this embodiment, a satisfactory solid state imager with less noise, and still causing no residual image can be provided.

Figure 11:
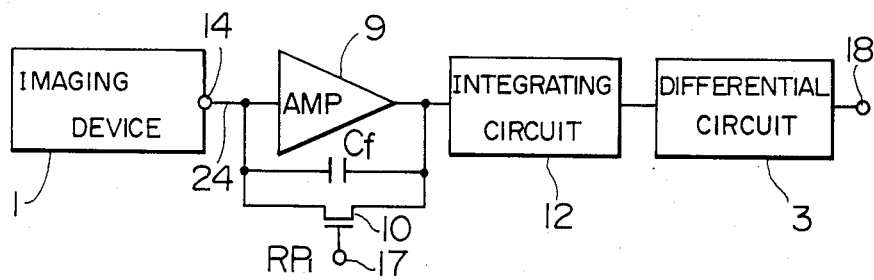
FIG. 11 is a block diagram of another embodiment of the present invention.

FIG. 11 shows another embodiment of the present invention. In the embodiment FIG. 11, the drain and source of an FET 10 serving as a reset switch are connected across a feedback capacitor Cf. The operation in this embodiment is entirely similar to the operation in the embodiment shown in FIG. 8.

This embodiment, because of the fact that the reset switch is arranged as described above, provides advantages as compared with the embodiment in FIG. 8 as follows:

(1) The resetting is performed at a high speed.
(2) The D.C. operating point of the differential amplifier 9 is stabilized.

Also, in this embodiment, an imager with less noise and reduced residual image can be provided.

Figure 12:
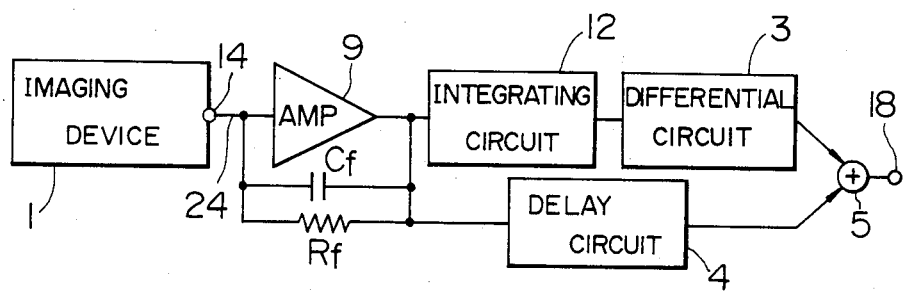
FIG. 12 is a block diagram of still another embodiment of the present invention.

FIG. 12 shows still another embodiment. In the embodiment in FIG. 12, in place of the FET 10 serving as the reset switch, a resistor Rf having a high resistance value is connected in parallel with a feedback capacitor Cf. In this embodiment, the electric charge accumulated on capacitance C of a signal output line 24 and the feedback capacitor Cf discharges gradually through the resistor Rf. In other words, the signal output line 24 is slowly reset by the high resistance of the resistor Rf. As a result, the signal electric charge on the imaging device output terminal 14 is not held completely, and it is lost little by little. However, this embodiment is advantageous in that the FET 10 for the reset switch is not required and the circuit scale can be reduced.

In this embodiment, a noise current is caused because the resistor Rf is connected. However, for example, if the resistor Rf is designed to have a large resistance value e.g., 10MΩ, the noise current will be as small as 0.04 pA/√Hz, and there will be no problem.

Further, in this embodiment, low frequency components at a frequency equal to or lower than a frequency $f_0=(2\pi CfRf)^{-1}$ determined by the feedback capacitor Cf having a capacitance value Cf and the resistor Rf having a resistance value Rf are suppressed in the output of a differential circuit 3. However, the low frequency components have already been present at the output terminal of a differential amplifier 9 after differentiation. As a result, by combining the output signal of the differential circuit 3 and the output signal of the differential amplifier 9 by an adder 5, a normal video signal is outputted to an output terminal 18. It should be noted that the output signal of the differential circuit 9 is supplied to the adder 5 through a delay circuit 4, and the delay circuit 4 is connected in order to compensate for a time delay caused in an integrating circuit 12. The amount of delay in the delay circuit 4 is usually about one pixel period.

As described in the foregoing, in this embodiment, a satisfactory solid state imager with less noise, and still causing little residual image can be provided.

Figure 13:
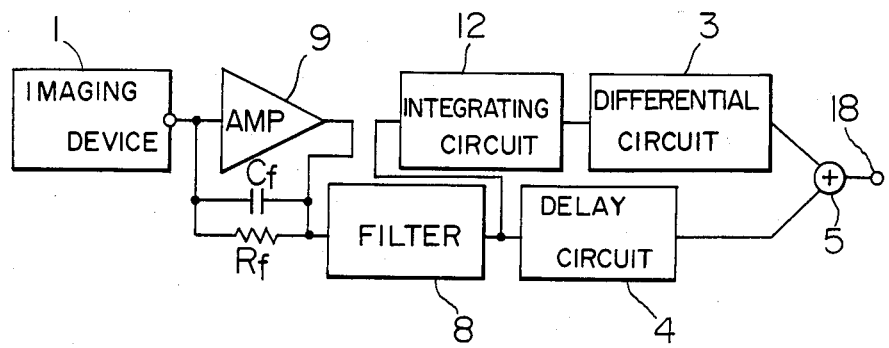
FIG. 13 is a block diagram of further embodiment of the present invention.

FIG. 13 shows another embodiment of the present invention. In the embodiment in FIG. 13, as compared with that in FIG. 12, the output signal of a differential amplifier 9 is supplied through a filter 8 to an integrating circuit 12 as well as a delay circuit 4.

In this embodiment, the aforementioned frequency $f_0$ can be determined by the filter 8 independently from the values of Rf and Cf. In other respects, the operation is similar to the embodiment in FIG. 12.

Figure 14:
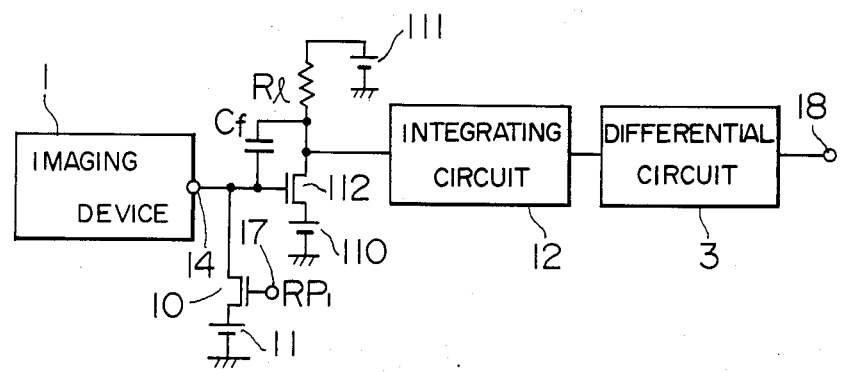
FIG. 14 is a block diagram showing a version of a part of the circuit in the embodiment in FIG. 8.

FIG. 14 shows an embodiment in which a concrete circuit of the differential amplifier 9 in the embodiment in FIG. 8 is shown. In the embodiment in FIG. 14, the differential amplifier 9 is constituted by an FET 112. A feedback capacitor Cf is constituted by an internal capacitance between the gate and drain of the FET 112. In other words, the internal capacitance Cgd between the gate and drain of the FET 112 is used as the feedback capacitor Cf.

In this embodiment, as compared with that shown in FIG. 8, since there is no need to connect a feedback capacitor anew, the noise is reduced correspondingly.

However, the capacitance Cgd between the gate and drain of the FET 112 has a large value which amounts to about 30-40% of the total gate capacitance, and the voltage gain of the first stage is restricted by the Miller effect of the capacitance Cgd between the gate and drain. This problem can be solved by reducing the noise of the integrating circuit 12.

Figure 15:
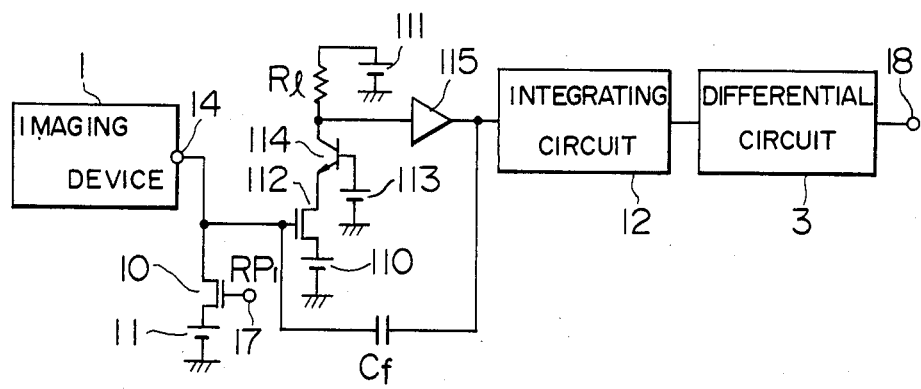
FIG. 15 is a block diagram showing another version of a part of the circuit in FIG. 8.

FIG. 15 shows another embodiment in which an example of a specific circuit of the differential amplifier 9 in the embodiment in FIG. 8 is shown. In the embodiment shown in FIG. 15, the aforementioned problem due to the capacitance Cgd between the gate and drain of the FET 112 is solved.

In this embodiment, the emitter of a transistor 114 whose base is grounded is connected to the drain of the FET 112, and the transistor 114 is connected in cascade. Reference numeral 115 designates a normal amplifier. By the transistor 114, the drain of the FET 112 is fixed to a constant potential, and the capacitance Cgd between the gate and drain of the FET 113 provides no Miller effect. Owing to this, there is an advantage in that the frequency characteristic and the voltage gain in the first stage are not deteriorated.

Figure 16:
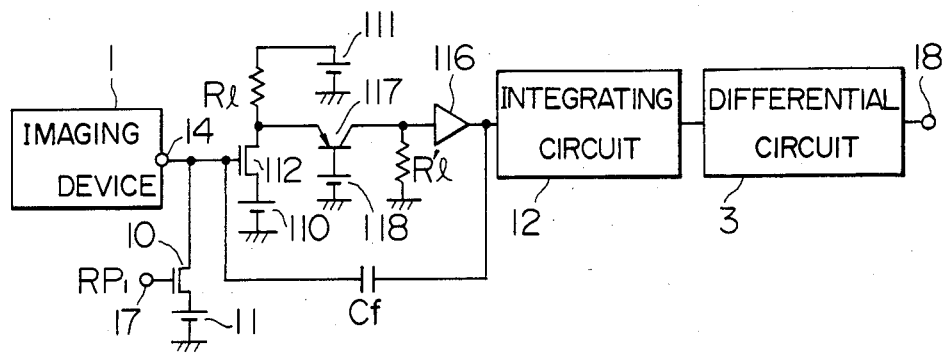
FIG. 16 is a block diagram showing still another version of a part of the circuit in FIG. 8.

FIG. 16 shows an embodiment in which an example of a further specific circuit of the differential amplifier 9 in the embodiment in FIG. 8 is shown.

The embodiment shown in FIG. 16, as is the case in the embodiment shown in FIG. 15, solves the problem of the capacitance Cgd between the gate and drain of the FET 112 which would provide the Miller effect.

In this embodiment, the emitter of a transistor 117 whose base is grounded is connected to the drain of the FET 112, and the emitter is also connected to a voltage source 111 through a resistor $R_l$. In other words, the transistor 117 having the base grounded is connected in a parallel cascade. Reference numeral 116 designates a normal amplifier. In the embodiment also, similar to the embodiment shown in FIG. 15, since the drain of the FET 112 is fixed to a constant potential, the capacitance Cgd between the gate and drain of the FET 112 provides no Miller effect. Owing to this, there is an advantage in that the deterioration of the frequency characteristic and the decrease of the gain in the first stage does not occur. Furthermore, in this embodiment, as compared with the embodiment shown in FIG. 15, it is advantageous in that the power supply voltage can be decreased by an amount corresponding to a voltage between the emitter and collector of the transistor 117, that is, about 1-3 V.

Figure 17:
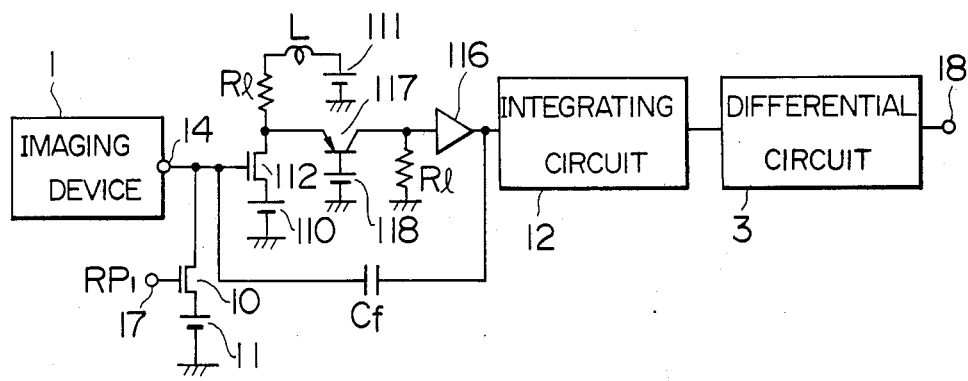
FIG. 17 is a block diagram showing another version of a part of the circuit in FIG. 8.

FIG. 17 shows another embodiment of the present invention. In the embodiment shown in FIG. 17, a coil L is further added between the resistor $R_l$ and the voltage source 111 in the embodiment in FIG. 16. The circuit arrangement excepting this is similar to the embodiment shown in FIG. 16.

In this embodiment, owing to the connection of the coil L, there is an advantage in that as compared with the embodiment shown in FIG. 16, the power supply voltage can be made even smaller. Moreover, due to the presence of the coil L, the mutual conductance gm of the transistor 117 is decreased, and by this decrease, the noise figure NF of the transistor 117 is decreased. Accordingly, there is an advantage in that a large current is supplied to the FET 112 with a small power supply voltage, and the noise generated in the FET 112 is reduced.

As described in the foregoing, also in the embodiments shown in FIGS. 13-17, solid state imagers with less noise and no residual image are provided.

Figure 18:
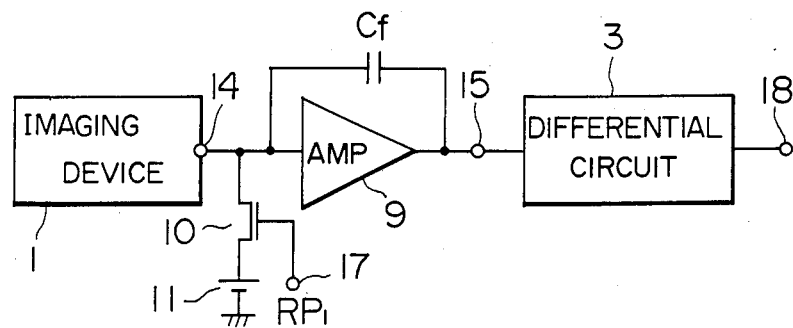
FIGS. 18 and 20 are block diagrams showing versions of the embodiment in FIG. 8.
Figure 19:
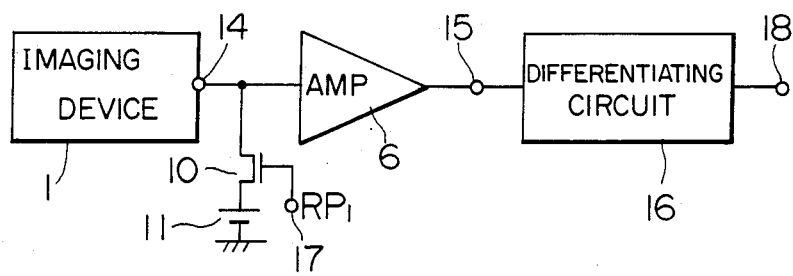
FIG. 19 is a block diagram of a version of the embodiment in FIG. 1.

Further, in the embodiments shown in FIGS. 1, 4, and 8-17, in all these cases, the integrating circuit 12 and the differential circuit 3 are used. However, these circuits are not indispensable in the present invention, and these circuits may be replaced by a differentiating circuit. The embodiment in which the integrating circuit is omitted from the embodiment shown in FIG. 8 is shown in FIG. 18. The embodiment in which the integrating circuit 12 and the differential circuit 3 in the embodiment in FIG. 1 are replaced by the differentiating circuit 16 is shown in FIG. 19. Further, the embodiment in which the integrating circuit 12 and the differential circuit 3 in the embodiment in FIG. 8 are replaced by the differentiating circuit 16 is shown in FIG. 20.

Figure 20:
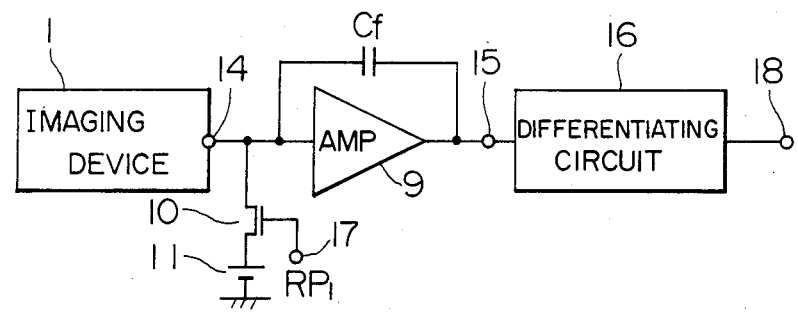

Also in the cases, in which the integrating circuit is omitted, and in which the integrating circuit 12 and the differential circuit 3 are replaced by the differentiating circuit 16 as in the embodiments shown in FIGS. 19-20, the noise suppressing effect can be maintained. Further, the reducing effect of the residual image is not changed.

We claim:

1. In a solid state imager including a plurality of pixels each having a photoelectric transducer element and scanning switches, scanners for scanning said pixels, output means for sequentially outputting pixel voltage signals produced by scanning said pixels, and an amplifier responsive to said voltage signals for sequentially producing amplified pixel signals indicative of pixel information, the improvement comprising:

a reset pulse input terminal for receiving a reset pulse at a predetermined period;

reset means connected to said output means and said reset pulse input terminal for resetting a potential of said output means in accordance with the reset pulse applied to said reset pulse input terminal; and differential means connected to said amplifier for providing at an output a differential signal in response to one of said pixel signals inputted from said amplifier and the pixel signal immediately preceding said one pixel signal.

2. A solid state imager according to claim 1, wherein said reset means comprises a FET having a gate connected to said reset pulse input terminal, a drain and a source, one of said drain and source being connected to said output means, and the other of said drain and source being coupled to a voltage source.

3. A solid state imager according to claim 2, further comprising an integrating circuit connected between said amplifier and said differential means for integrating said pixel signals supplied from said amplifier one by one to supply an integrated output to said differential means.

4. A solid state imager according to claim 1, wherein said reset pulse input terminal receives one reset pulse during each horizontal scanning period.

5. A solid state imager according to claim 1, further comprising an integrating circuit connected between said amplifier and said differential means for integrating said pixel signals supplied from said amplifier one by one to supply an integrated output to said differential means.

6. A solid state imager according to claim 1, wherein said differential means comprises a delay circuit for delaying an input signal to said differential means for one pixel period to output a delayed input signal, and a differential amplifier having one input supplied with said delayed input signal from said delay circuit and a second input supplied with said input signal to said differential means and providing at said output a differential signal.

7. In a solid state imager including a plurality of pixels each having a photoelectric transducer element and scanning switches, scanners for scanning said pixels, output means for sequentially outputting pixel voltage signals produced by scanning said pixels, and an inverting amplifier responsive to said voltage signals for sequentially producing inverted and amplified pixel signals indicative of pixel information, the improvement comprising:
- a reset pulse input terminal for receiving a reset pulse at a predetermined period;
- reset means connected to said output means and said reset pulse input terminal for resetting a potential of said output means in accordance with the reset pulse applied to said reset pulse input terminal;
- differential means connected to said inverting amplifier for providing at an output a differential signal in response to one of said pixel signals inputted from said inverting amplifier and the pixel signal immediately preceding said one pixel signal; and
- a capacitor having opposite ends connected respectively to said output means and to the output terminal of said inverting amplifier.

8. A solid state imager according to claim 7, wherein said reset means comprises a FET having a gate connected to said reset pulse input terminal, a drain and a source, one of said drain and source being connected to said output means, and the other of said drain and source being coupled to a voltage source.

9. A solid state imager according to claim 8, further comprising an integrating circuit connected between said inverting amplifier and said differential means for integrating said pixel signals supplied from said inverting amplifier one by one to supply an integrated output to said differential means.

10. A solid state imager according to claim 7, wherein said reset means comprises a FET having a drain and a source, one of said drain and source being connected to said output means, the other of said drain and source being connected to the output terminal of said inverting amplifier, and a gate connected to said reset pulse input terminal.

11. A solid state imager according to claim 10, further comprising an integrating circuit connected between said inverting amplifier and said differential means for integrating said pixel signals supplied from said inverting amplifier one by one to supply an integrated output to said differential means.

12. A solid state imager according to claim 7, wherein said reset pulse input terminal receives one reset pulse during each horizontal scanning period.

13. A solid state imager according to claim 7, further comprising an integrating circuit connected between said inverting amplifier and said differential means for integrating said pixel signals supplied from said inverting amplifier one by one to supply an integrated output to said differential means.

14. A solid state imager according to claim 7, wherein said differential means comprises a delay circuit for delaying an input signal of said differential means for one pixel period to output a delayed input signal, and a differential amplifier having one input supplied with said delayed input signal from said delay circuit and a second input supplied with said input signal of said differential means and providing at said output a difference signal.

15. In a solid state imager including a plurality of pixels each having a photoelectric transducer element and scanning switches, scanners for scanning said pixels, output means for sequentially outputting pixel voltage signals produced by scanning said pixels, and an inverting amplifier responsive to said voltage signals for sequentially producing inverted and amplified pixel signals, indicative of pixel information, at an output terminal thereof, the improvement comprising:
- a capacitor having opposite ends connected respectively to said output means and to said output terminal of said inverting amplifier;
- a resistor connected in parallel with said capacitor;
- differential means having an input coupled to said output terminal of said inverting amplifier for producing a differential output signal in response to one of said pixel signals supplied from said inverting amplifier and the pixel signal immediately preceding said one pixel signal;
- a delay circuit coupled to said output terminal of said inverting amplifier and to the input of said differential means for delaying an input signal of said differential means for a selected period so as to output a delayed input signal; and
- an adder supplied with the output signal from said differential means and the delayed signal from said delay circuit for combining the supplied two signals so as to output a composite signal.

16. A solid state imager according to claim 15, further comprising an integrating circuit connected between said inverting amplifier and the input of said differential means and inputted with said pixel signals supplied from said inverting amplifier, said integrating circuit integrating said pixel signals one by one to output an integrated signal to said differential means.

17. A solid state imager according to claim 16 further comprising a filter connected to the output terminal of said inverting amplifier for passing a signal of a predetermined frequency, an output signal of said filter being supplied to said integrating circuit and to said delay circuit.

18. In a solid state imager including a plurality of pixels each having a photoelectric transducer element and scanning switches, scanners for scanning said pixels, output means for sequentially outputting pixel voltage signals produced by scanning said pixels, and an amplifier responsive to said voltage signals for sequentially producing amplified pixel signals indicative of pixel information, the improvement comprising:
- a reset pulse input terminal for receiving a reset pulse at a predetermined period;
- reset means connected to said output means and said reset pulse input terminal for resetting a potential of said output means in accordance with the reset pulse applied to said reset pulse input terminal; and
- a differentiating circuit connected to said amplifier for providing an output signal in response to successive ones of said amplified pixel signals inputted from said amplifier.

19. In a solid state imager including a plurality of pixels each having a photoelectric transducer element and scanning switches, scanners for scanning said pixels, output means for sequentially outputting pixel voltage signals produced by scanning said pixels, and an inverting amplifier responsive to said voltage signals for sequentially producing inverted and amplified pixel signals, indicative of pixel information, at an output terminal thereof, the improvement comprising:
- a capacitor having opposite ends connected respectively to said output means and to said output terminal of said inverting amplifier;
- a resistor connected in parallel with said capacitor;
- a differentiating circuit having an input coupled to said output terminal of said inverting amplifier for producing an output signal in response to successive ones of said inverted and amplified pixel signals supplied from said inverting amplifier;
- a delay circuit coupled to said output terminal of said inverting amplifier and to the input of said differentiating circuit for delaying an input signal of said differentiating circuit for a selected period so as to output a delayed input signal; and
- an adder supplied with the output signal from said differentiating circuit and the delayed signal from said delay circuit for combining the supplied two signals so as to output a composite signal.

20. A solid state imager according to claim 22, further comprising an integrating circuit connected between said inverting amplifier and the input of said differentiating circuit and inputted with said pixel signals supplied from said inverting amplifier, said integrating circuit integrating said pixel signals one by one to output an integrated signal to said differentiating circuit.

* * * * *

UNITED STATES PATENT AND TRADEMARK OFFICE
CERTIFICATE OF CORRECTION

PATENT NO. : 4,809,074

DATED : February 28, 1989

INVENTOR(S) : Imaide, et al.

It is certified that error appears in the above-identified patent and that said Letters Patent is hereby corrected as shown below:

Title page, left-hand column:

"[30]     Foreign Application Priority Data
    Jun. 16, 1986 [JP]    Japan ...............61-138205"

should read:

--[30]     Foreign Application Priority Data
    Jun. 16, 1986 [JP]    Japan ...............61-138203--

Signed and Sealed this

Twenty-eighth Day of November 1989

Attest:

JEFFREY M. SAMUELS

Attesting Officer        Acting Commissioner of Patents and Trademarks